United States Patent
Kitani

(10) Patent No.: US 8,320,285 B2
(45) Date of Patent: Nov. 27, 2012

(54) COMMUNICATION TERMINAL AND RECORDING MEDIUM

(75) Inventor: Mitsuhiro Kitani, Kanagawa (JP)

(73) Assignee: Casio Hitachi Mobile Communications Co., Ltd., Tokyo (JP)

(*) Notice: Subject to any disclaimer, the term of this patent is extended or adjusted under 35 U.S.C. 154(b) by 824 days.

(21) Appl. No.: 12/214,187

(22) Filed: Jun. 16, 2008

(65) Prior Publication Data

US 2008/0310370 A1 Dec. 18, 2008

(30) Foreign Application Priority Data

Jun. 15, 2007 (JP) .................... 2007-159535

(51) Int. Cl.
*H04B 7/00* (2006.01)
(52) U.S. Cl. ........................................ 370/310
(58) Field of Classification Search .......... 370/310, 370/328–332; 455/553, 557, 558, 422–426, 455/434
See application file for complete search history.

(56) References Cited

U.S. PATENT DOCUMENTS

| 6,226,527 | B1 * | 5/2001 | Dalsgaard et al. | 455/553.1 |
| 6,957,068 | B2 * | 10/2005 | Hutchison et al. | 455/435.2 |
| 7,251,490 | B2 * | 7/2007 | Rimoni | 455/436 |
| 7,715,868 | B2 * | 5/2010 | Zhao et al. | 455/550.1 |
| 7,756,068 | B2 * | 7/2010 | Tao et al. | 370/311 |
| 7,818,025 | B2 * | 10/2010 | Zhao et al. | 455/550.1 |
| 2006/0034228 | A1 * | 2/2006 | Kim et al. | 370/335 |
| 2006/0268336 | A1 | 11/2006 | Sakaniwa et al. | |
| 2007/0011503 | A1 | 1/2007 | Kitani et al. | |
| 2007/0032236 | A1 * | 2/2007 | Kim et al. | 455/436 |
| 2007/0121536 | A1 | 5/2007 | Aihara | |
| 2007/0275737 | A1 | 11/2007 | Sakaniwa | |
| 2008/0309490 | A1 * | 12/2008 | Honkanen et al. | 340/572.1 |

FOREIGN PATENT DOCUMENTS

| JP | 09-160855 | 6/1997 |
| JP | 10-327463 | 12/1998 |
| JP | 2000-201382 | 7/2000 |
| JP | 2002-112347 | 4/2002 |
| JP | 2005-198021 | 7/2005 |
| JP | 2007-053741 | 3/2007 |
| WO | WO 2006/137147 | 12/2006 |

* cited by examiner

Primary Examiner — Dmitry H Levitan
(74) Attorney, Agent, or Firm — Cozen O'Connor

(57) ABSTRACT

A communication terminal has a plurality of wireless communication units. An access control unit determines whether or not a selected wireless interface is in a state where a connection request is possible based on communication state information on the wireless interface selected beforehand in the plurality of wireless interfaces. When determining that a connection request using the selected wireless interface is not possible, the access control unit determines whether or not to change over the wireless interface used for a communication based on a changeover availability information table set beforehand. When determining that a changeover of the wireless interface is not possible, the access control unit idles without performing a connection request to establish a communication until it is determined that a connection request through the selected wireless interface becomes possible.

21 Claims, 13 Drawing Sheets

| ID | APPLICATION | COMMUNICATION MEANS | CHANGEOVER FLAG | EXTENSION PERMITTED TIME |
|---|---|---|---|---|
| 1 | VERBAL COMMUNICATION | FIRST WIRELESS COMMUNICATION UNIT | ON | — |
| 2 | EMAIL | SECOND WIRELESS COMMUNICATION UNIT | ON | — |
| 3 | SMS | FIRST WIRELESS COMMUNICATION UNIT | OFF | 10min |
| 4 | MUSIC TRANSMISSION/RECEPTION APPLICATION | SECOND WIRELESS COMMUNICATION UNIT | OFF | 60min |
| 5 | VIDEO TRANSMISSION/RECEPTION APPLICATION | SECOND WIRELESS COMMUNICATION UNIT | OFF | 120min |
| 6 | FILE TRANSMISSION/RECEPTION APPLICATION | SECOND WIRELESS COMMUNICATION UNIT | ON | — |

FIG. 3A

| ID | APPLICATION | COMMUNICATION MEANS | CHANGEOVER FLAG | EXTENSION PERMITTED TIME |
|---|---|---|---|---|
| 1 | VERBAL COMMUNICATION | FIRST WIRELESS COMMUNICATION UNIT | ON | — |
| 2 | EMAIL | SECOND WIRELESS COMMUNICATION UNIT | ON | — |
| 3 | SMS | FIRST WIRELESS COMMUNICATION UNIT | OFF | 10min |
| 4 | MUSIC TRANSMISSION/RECEPTION APPLICATION | SECOND WIRELESS COMMUNICATION UNIT | OFF | 60min |
| 5 | VIDEO TRANSMISSION/RECEPTION APPLICATION | SECOND WIRELESS COMMUNICATION UNIT | OFF | 120min |
| 6 | FILE TRANSMISSION/RECEPTION APPLICATION | SECOND WIRELESS COMMUNICATION UNIT | ON | — |

FIG. 3B

| ID | APPLICATION | COMMUNICATION MEANS | CHANGEOVER FLAG | EXTENSION PERMITTED TIME | PRIORITY ORDER |
|---|---|---|---|---|---|
| 1 | VERBAL COMMUNICATION | FIRST WIRELESS COMMUNICATION UNIT | ON | — | — |
| 2 | EMAIL | SECOND WIRELESS COMMUNICATION UNIT | ON | — | AUTO |
| 3 | SMS | FIRST WIRELESS COMMUNICATION UNIT | OFF | 10min | MEDIUM |
| 4 | MUSIC TRANSMISSION/RECEPTION APPLICATION | SECOND WIRELESS COMMUNICATION UNIT | OFF | 60min | LOW |
| 5 | VIDEO TRANSMISSION/RECEPTION APPLICATION | SECOND WIRELESS COMMUNICATION UNIT | OFF | 120min | AUTO |
| 6 | FILE TRANSMISSION/RECEPTION APPLICATION | SECOND WIRELESS COMMUNICATION UNIT | ON | — | HIGH |

FIG. 11

| ID | APPLICATION | COMMUNICATION MEANS | FIRST CHANGEOVER FLAG | ... | NTH CHANGEOVER FLAG | FIRST EXTENSION PERMITTED TIME | ... | NTH EXTENSION PERMITTED TIME |
|---|---|---|---|---|---|---|---|---|
| 1 | VERBAL COMMUNICATION | FIRST WIRELESS COMMUNICATION UNIT | ON | ... | ON | — | ... | — |
| 2 | EMAIL | N-1TH WIRELESS COMMUNICATION UNIT | ON | ... | ON | — | ... | — |
| 3 | SMS | NTH WIRELESS COMMUNICATION UNIT | OFF | ... | ON | 10min | ... | 10min |
| 4 | MUSIC TRANSMISSION /RECEPTION APPLICATION | NTH WIRELESS COMMUNICATION UNIT | ON | ... | OFF | 60min | ... | 30min |
| 5 | VIDEO TRANSMISSION /RECEPTION APPLICATION | NTH WIRELESS COMMUNICATION UNIT | OFF | ... | OFF | 120min | ... | 60min |
| 6 | FILE TRANSMISSION /RECEPTION APPLICATION | N-1TH WIRELESS COMMUNICATION UNIT | ON | ... | ON | — | ... | — |

FIG. 13

| ID | APPLICATION | FIRST PRIORITY ORDER (25a) | SECOND PRIORITY ORDER (25b) | ... (25c) | NTH PRIORITY ORDER (25d) |
|---|---|---|---|---|---|
| 1 | VERBAL COMMUNICATION | FIRST WIRELESS COMMUNICATION UNIT | SECOND WIRELESS COMMUNICATION UNIT | ... | FIRST WIRELESS COMMUNICATION UNIT |
| 2 | EMAIL | N-1TH WIRELESS COMMUNICATION UNIT | NTH WIRELESS COMMUNICATION UNIT | ... | SECOND WIRELESS COMMUNICATION UNIT |
| 3 | SMS | NTH WIRELESS COMMUNICATION UNIT | FIRST WIRELESS COMMUNICATION UNIT | ... | N-1TH WIRELESS COMMUNICATION UNIT |
| 4 | MUSIC TRANSMISSION/RECEPTION APPLICATION | SECOND WIRELESS COMMUNICATION UNIT | FIRST WIRELESS COMMUNICATION UNIT | ... | N-1TH WIRELESS COMMUNICATION UNIT |
| 5 | VIDEO TRANSMISSION/RECEPTION APPLICATION | NTH WIRELESS COMMUNICATION UNIT | N-1TH WIRELESS COMMUNICATION UNIT | ... | SECOND WIRELESS COMMUNICATION UNIT |
| 6 | FILE TRANSMISSION/RECEPTION APPLICATION | N-1TH WIRELESS COMMUNICATION UNIT | SECOND WIRELESS COMMUNICATION UNIT | ... | FIRST WIRELESS COMMUNICATION UNIT |

COMMUNICATION TERMINAL AND RECORDING MEDIUM

BACKGROUND OF THE INVENTION

1. Field of the Invention

The present invention relates to a communication terminal having a plurality of wireless interfaces, and a recording medium that records a program which is executed by the foregoing communication terminal.

2. Description of the Related Art

Recently, various wireless networks, such as a cellular phone network and a wireless LAN (Local Area Network) become widespread. Establishing connections to plural kinds of wireless networks through one communication terminal is increasingly demanded along with the widespread utilization of the wireless networks.

The individual wireless networks have different characteristics (specifically, a communication speed, a fee, a security level, and the like). Thus, as disclosed in, for example, Unexamined Japanese Patent Application KOKAI Publication No. H09-160855, there is proposed a method of causing a user to pre-select the kind of a wireless network used for a communication for each application software (hereinafter called "application") loaded in a communication terminal, and of accessing the selected wireless network, thereby establishing a communication.

Furthermore, as disclosed in, for example, Unexamined Japanese Patent Application KOKAI Publication No. 2002-112347, there is also proposed a method of causing a communication terminal, which is compatible with plural kinds of wireless networks, to automatically change over a wireless network to another wireless network to communicate when a communication through a communication scheme in accordance with a selected wireless network is difficult.

SUMMARY OF THE INVENTION

According to the foregoing scheme, the communication terminal which can use plural kinds of wireless networks automatically changes a wireless network to another wireless network when a communication through a wireless network selected by a user (i.e., a desired wireless network) is difficult. Therefore, maintaining a communication through a desired and originally selected wireless network is difficult.

Accordingly, it is an object of the invention to provide a communication terminal and a recording medium that records a program which enables a communication through an originally selected wireless network even when a communication through the wireless network selected by a user is difficult.

To achieve the object, a communication terminal according to the first aspect of the invention comprises:

a plurality of wireless interfaces;

a communication availability determination unit which determines whether or not a connection request through a wireless interface selected beforehand in the plurality of wireless interfaces is possible based on a state of the selected wireless interface;

a changeover determination unit which determines whether or not to change over a wireless interface used for a communication based on changeover availability information set beforehand when the communication availability determination unit determines that a connection request through the selected wireless interface is not possible; and a connection request controller which idles without performing a connection request until it is determined through another determination of the communication availability determination unit that a connection request through the selected wireless interface becomes possible, when the changeover determination unit determines that a changeover of the wireless interface can not be carried out.

To achieve the object, a recording medium according to the second aspect of the invention stores a program that allows a computer to execute:

a first step of determining whether or not a connection request through a wireless interface selected beforehand in a plurality of wireless interfaces is possible based on a state of the selected wireless interface;

a second step of determining whether or not to change over a wireless interface used for a communication based on changeover availability information set beforehand, when it is determined in the first step that a connection request through the selected wireless interface is not possible; and a third step of idling without performing a connection request until it is determined through another determination that a connection request through the selected wireless interface becomes possible, when it is determined in the second step that a changeover of the wireless interface can not be carried out.

According to the invention, it becomes possible to maintain a communication through a selected wireless network even when a communication through the wireless network selected by a user is difficult.

BRIEF DESCRIPTION OF THE DRAWINGS

The object and other objects and advantages of the present invention will become more apparent upon reading of the following detailed description and the accompanying drawings in which:

FIGS. 3A and 3B are diagrams showing information tables of the communication terminal shown in FIG. 2;

FIG. 11 is a diagram showing an information table used to perform a communication control process when first to nth wireless communication units are present;

FIG. 13 is a diagram showing an information table used to perform a communication control process when the first to nth wireless communication units are present.

DETAILED DESCRIPTION OF THE PREFERRED EMBODIMENTS (First Embodiment)

An explanation will be given of a communication terminal 1 according to the first embodiment of the invention.

Figure 1:
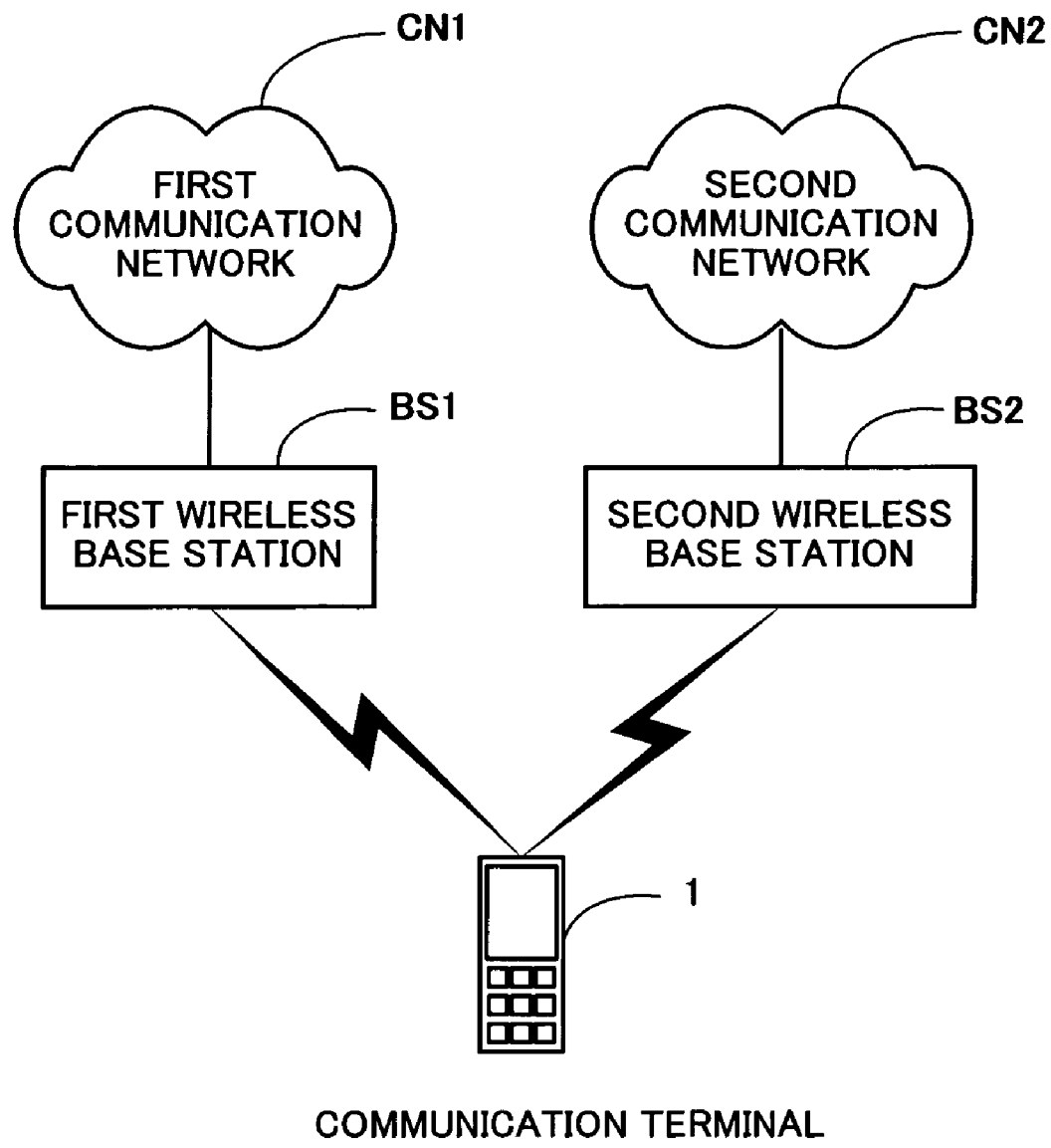
FIG. 1 is a general structural diagram showing a wireless communication system including a communication terminal which has plural wireless interfaces.

As shown in FIG. 1, the communication terminal 1 can be connected to a first communication network CN1 and a second communication network CN2 through a first wireless base station BS1 and a second wireless base station BS2, respectively.

Figure 2:
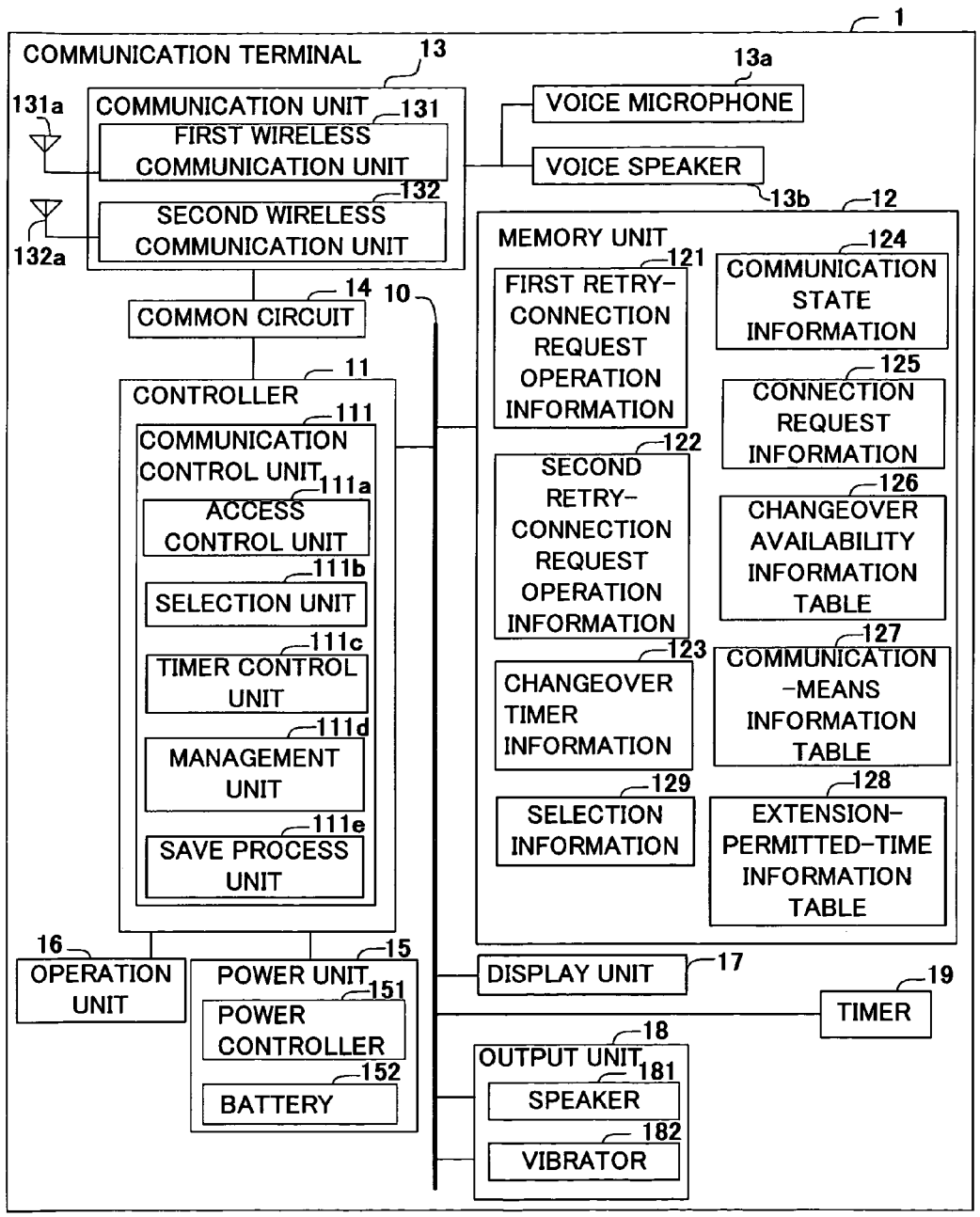
FIG. 2 is a diagram showing the structure of a communication terminal according to the first embodiment of the invention.

As shown in FIG. 2, the communication terminal 1 has a bus 10, a controller 11, a memory unit 12, a communication unit 13, a voice microphone 13a, a voice speaker 13b, a common circuit 14, a power unit 15, an operation unit 16, a display unit 17, an output unit 18, and a timer 19.

(Communication Unit 13)

First, the communication unit 13 will be explained.

The communication unit 13 has a first wireless communication unit 131 and a second wireless communication unit 132.

The first wireless communication unit 131 is connected to an antenna 131a, and the second wireless communication unit 132 is connected to an antenna 132a.

The first wireless communication unit 131 is a wireless interface which accesses a base station (e.g., the first wireless base station BS1 shown in FIG. 1) compatible with a first wireless communication scheme, and establishes a wireless communication through the antenna 131a.

An example of the first wireless communication scheme is a cellular mobile communication scheme like CDMA (Code Division Multiple Access). However, the first wireless communication scheme may be any schemes as long as a wideband wireless communication is possible, and may be another cellular scheme or a mobile communication scheme like GSM (Global System for Mobile Communications).

The first wireless communication unit 131 transmits and receives, for example, a voice signal, a video signal, a data signal and the like with the first wireless base station BS1 shown in FIG. 1.

The second wireless communication unit 132 is a wireless interface which accesses a base station (e.g., the second wireless base station BS2 shown in FIG. 1) compatible with a second wireless communication scheme different from the first wireless communication scheme, and establishes a communication through the antenna 132b.

An example of the second wireless communication scheme is a wireless LAN (Local Area Network) communication system compatible with IEEE 802.11b, IEEE 802.11a, and IEEE 802.11g standards. However, the second wireless communication scheme may be any schemes as long as it is a local wireless communication scheme, and may be another local wireless communication scheme like UWB (Ultra Wide Band).

The second wireless communication unit 132 transmits and receives a voice signal, a video signal, a data signal, and the like with the second wireless base station BS2.

The communication terminal 1 has the foregoing first wireless communication unit 131 and second wireless communication unit 132, thereby achieving both wide-area connectivity, which is the characteristic of a wideband wireless communication scheme, and inexpensive and fast data communication characteristic, which is the characteristic of a local wireless communication scheme.

The common circuit 14 is placed between the controller 11 and the communication unit 13. The common circuit 14 commonly processes both wireless signal from the first wireless communication unit 131 and wireless signal from the second wireless communication unit 132.

The controller 11 controls the general operation of the communication terminal 1 overall. The controller 11 is constituted by a non-illustrated CPU (Central Processing Unit).

The memory unit 12 comprises, for example, a nonvolatile memory like a flash memory or a RAM (Random Access Memory).

The memory unit 12 functions as a work area where various information and tables used by the controller 11 are stored.

As the CPU in the controller 11 runs, for example, an operation program stored in the memory unit 12, and refers/stores data relative to various information and tables stored in the memory unit 12 in accordance with necessity, the overall control is accomplished. The operation program is recorded in a recording medium or the like, and is installed in the memory unit 12 from such a recording medium. Note that programs to be executed by the CPU include various kinds of application programs to be discussed later loaded in the communication terminal 1.

The controller 11 has a communication control unit 111.

The communication control unit 111 controls the first wireless communication unit 131 and the second wireless communication unit 132 of the communication unit 13. The communication control unit 111 gives the first wireless communication unit 131 and the second wireless communication unit 132 an instruction of changing a communication state. In response to the instruction, the communication states of the first wireless communication unit 131 and the second wireless communication unit 132 are changed to states of transmitting/receiving a wireless signal, and an idle state, and the like. Changing the communication state realizes the control of the first wireless communication unit 131 and the second wireless communication unit 132 by the communication control unit 111.

Next, an explanation will be given of individual structural components of the communication control unit 111 in detail while complementarily explaining various information and tables stored in the memory unit 12.

The communication control unit 111 has an access control unit 111a, a selection unit 111b, a timer control unit 111c, a management unit 111d, and a save process unit 111e.

The memory unit 12 stores first retry-connection request operation information 121, second retry-connection request operation information 122, changeover timer information 123, communication state information 124, connection request information 125, a changeover availability information table 126, a communication-means information table 127, a extension-permitted-time information table 128, and selection information 129.

(Access Control Unit)

The access control unit 111a is a main controller in the communication control unit 111. The access control unit 111a changes the operation states of the first wireless communication unit 131 and the second wireless communication unit 132.

(Access Control Unit—Communication-Means Information Table)

A wireless interface used for a communication in plural wireless interfaces (first wireless communication unit 131 and second wireless communication unit 132) of the communication unit 13 is set in the communication-means information table 127 of the memory unit 12. A wireless interface used for a communication can be set in the communication-means information table 127 through an input operation using the operation unit 16. That is, a user can select a wireless interface to be used for a communication. Furthermore, a wireless interface can be set in the communication-means information table 127 application by application loaded in the communication terminal 1.

As receiving a request of starting a communication from the user through the operation unit 16, the access control unit 111a refers to the communication-means information table 127, and decides a wireless interface used for a communication by an application.

(Access Control Unit—Communication State Information)

The memory unit 12 stores current communication states of the first wireless communication unit 131 and the second wireless communication unit 132 as communication state information 124. The communication states are set as, for example, "idle", "out of range", and "connect".

The access control unit 111a refers to the communication state information 124, thereby detecting a current communication state of a wireless interface used for an application, and determining whether or not to perform a connection request using that wireless interface based on the current communication state.

(Access Control Unit—Changeover Availability Information Table)

Set in the changeover availability information table 126 of the memory unit 12 is a changeover flag which indicates whether or not a changeover to another wireless interface is carried out when a communication through the first wireless communication unit 131 or the second wireless communication unit 132 is not possible because of some reason.

The changeover flag is set beforehand in the changeover availability information table 126 through an input operation using the operation unit 16. Namely, the changeover flag is set by the user. The changeover flag is set for each application.

When a communication through a wireless interface selected beforehand is not possible, the access control unit 111a refers to the changeover availability information table 126, and determines whether or not to change over a wireless interface used for a communication by that application to another wireless interface.

(Access Control Unit—Extension-Permitted-Time Information Table)

The extension-permitted-time information table 128 of the memory unit 12 stores a time limit (extension permitted time) of idling until a wireless interface becomes usable when it is determined that the wireless interface is not to be changed over through the foregoing determination.

The extension permitted time is set beforehand in the extension-permitted-time information table 128 through an operation using the operation unit 16. The extension permitted time is set for each application.

The access control unit 111a changes over a wireless interface to another wireless interface when an extension permitted time elapses.

(Access Control Unit—Changeover Timer Information)

The timer 19 counts a time. The foregoing extension permitted time is set in the timer 19. The extension permitted time counted by the timer 19 is stored in the changeover timer information 123 in the memory unit 12. That is, it is possible to determine whether or not a time counted by the timer 19, i.e., the extension permitted time, elapses and the timer 19 expires by referring to the changeover timer information 123.

The access control unit 111a refers to the changeover timer information 123, and transmits a request of changing over a wireless interface to the selection unit 111b when it is determined that the extension permitted time elapses and the timer 19 expires.

(Selection Unit—Selection Information)

As the selection unit 111b receives a request of changing over a wireless interface from the access control unit 111a, the selection unit 111b selects a wireless interface to be used for a communication, and stores information on the selected wireless interface in the memory unit 12 as the selection information 129. In the embodiment, when the first wireless communication unit 131 is set in the communication-means information table 127, the selection unit 111b selects the second wireless communication unit 132, and when the second wireless communication unit 132 is set, the selection unit 111b selects the first wireless communication unit 131.

Namely, the selection information 129 includes information on a wireless interface which is to be changed over in changing a wireless interface used for a communication to another wireless interface.

(Timer Control Unit)

The timer control unit 111c controls various timers including the timer 19 used for a communication control with the first wireless communication unit 131 and the second wireless communication unit 132.

(Management Unit—Communication State Information)

The management unit 111d stores information on current communication states of the first wireless communication unit 131 and the second wireless communication unit 132 of the communication unit 13, i.e., information on communication states such as "idle", "out of range", and "connect", as the communication state information 124 in the memory unit 12.

(Save Process Unit—Connection request information)

The save process unit 111e saves communication history information, used for a connection request retry with respect to an error in connection request and used for a communication restart with respect to an error in communication, as the connection request information 125 in the memory unit 12.

The connection request information 125 includes information on a connection request like a connection destination of a communication partner. The connection request information 125 is saved when the operation state of the first or second wireless communication terminal 131, 132 is out of range, or when a communication is failed or a communication is not possible due to a communication state or the like of the communication partner.

The first retry-connection request operation information 121 includes information on an acquisition timing of a radio wave through the first wireless communication unit 131, and timings for a connection request retry and a restart of a communication. The first retry-connection request operation information 121 is used when a communication through the first wireless communication unit 131 is attempted but is not established due to the transmission/reception state of a radio wave through the first wireless communication unit 131, and the communication state of the communication partner.

The second retry-connection request operation information 122 includes information on an acquisition timing of a radio wave through the second wireless communication unit 132, and timings for a connection request retry and a restart of a communication. The second retry-connection request operation information 122 is used when a communication through the second wireless communication unit 132 is attempted but is not established due to the transmission/reception state of a radio wave through the second wireless communication unit 132, and the communication state of the communication partner.

In the embodiment, an acquisition timing of a radio wave to establish a wireless communication and a retry timing of a connection request included in the first retry-connection request operation information 121 and an acquisition timing of a radio wave to establish a wireless communication and a retry timing of a connection request included in the second retry-connection request operation information 122 are individually stored in different memory areas in the memory unit 12.

This makes it possible to control an acquisition of a radio wave and a connection request retry through the respective wireless communication units in detail. Therefore, it is possible to reduce a time until a completion of a communication and the power consumption of the communication terminal 1. As a result, the convenience of the communication terminal 1 improves.

Meanwhile, in the embodiment, the three tables of the changeover availability information table 126, the communication-means information table 127, and the extension-permitted-time information table 128 are separately stored in the memory unit 12, but those tables may be combined with one another to constitute a single table. There is no difference in the operation of the communication terminal 1 between in a case where the information tables are separated in three tables and in a case where those information tables are combined with one another to constitute a single table. In a case where the changeover availability information table 126, the communication-means information table 127, and the extension-permitted-time information table 128 are combined together to constitute a single table, such a single table has a structure exemplified in FIG. 3A.

An information table 200 shown in FIG. 3A has an ID setting area 20, an application setting area 21, a communication means setting area 22, a changeover flag setting area 23, and an extension permitted time setting area 24.

Unique ID information allocated for each application is set in the ID setting area 20. Various applications corresponding to the respective ID information and loaded in the communication terminal 1 are set in the application setting area 21 (hereinafter, briefly called "application 21").

According to the information table 200 shown in FIG. 3A, verbal communication, E-mail, SMS (Short Message Service), music transmission/reception applications, a video transmission/reception applications, and a file transmission/reception applications are set in the application 21. Those are applications that the communication terminal 1 has, and are for transmitting/receiving voice data, video data, and electronic files. However, the applications set in the information table 200 shown in FIG. 3A are just examples, and other applications may be set as long as those are for transmitting/receiving a voice and data.

(Communication Means Setting Area)

The communication means setting area 22 (hereinafter, briefly called "communication means 22") corresponds to the communication-means information table 127.

A name of a wireless interface used in communication is set in the communication means 22. In the embodiment, because the communication unit 13 has the first wireless communication unit 131 and the second wireless communication unit 132, either one of the first wireless communication unit 131 and the second wireless communication unit 132 is set in the communication means 22.

(Changeover Flag Setting Area)

The changeover flag setting area 23 (hereinafter, briefly called "changeover flag 23") corresponds to the changeover availability information table 126.

A changeover flag indicating the changeover availability of a wireless interface is set in the changeover flag 23.

The changeover flag 23 is represented by ON or OFF.

In a case where the changeover flag 23 is set ON, the access control unit 111a changes over a wireless interface to another wireless interface to perform a communication when a communication through a decided wireless interface is not possible.

In a case where the changeover flag 23 is set OFF, the access control unit 111a does not change over a wireless interface even when a communication through a decided wireless interface is not possible, and idles until the decided wireless interface becomes usable.

(Extension Permitted Time Setting Area)

The extension permitted time setting area 24 (hereinafter, briefly called "extension time permitted time 24") corresponds to the extension-permitted-time information table 128.

Set in the extension permitted time 24 is the longest time of idling until a wireless interface becomes usable after it is determined that a communication through the wireless interface set in the communication means 22 is not possible.

As the extension permitted time elapses, a wireless interface is changed over.

The communication means 22, the changeover flag 23, and the extension permitted time 24 are stored in the information table 200 in association with each application set in the application 21.

As shown in FIG. 3B, an information table 201 may further have a priority order setting area 25 associated with two information in the changeover flag 23 and the extension permitted time 24. A priority order is set in the priority order setting area 25 for each application through an operation using the operation unit 16. The information table 201 shown in FIG. 3B has the changeover flag 23 and the extension permitted time 24 in which a changeover flag and an extension permitted time both corresponding to a priority order are automatically set respectively.

Three stages of priority orders, such as "high", "medium", "low", are set in the priority order setting area 25 (hereinafter, briefly called "priority order 25") for each application.

For example, regarding an application set to "high" in the priority order 25, the changeover flag 23 is set ON, and the extension permitted time 24 is set as "none" (in FIG. 3B, it is indicated by hyphen).

Regarding an application set to "medium" in the priority order 25, the changeover flag 23 is set OFF, and the extension permitted time 24 is set to "10 [min]".

Further, regarding an application set to "low" in the priority order 25, the changeover flag 23 is set OFF, and the extension permitted time 24 is set to "60 [min]".

The priority order may be set as "AUTO" for a case where it is not necessary to specifically set the changeover flag 23 or the extension permitted time 24 for an application.

When the priority order is set as "AUTO", initial values set for each application beforehand are set in the changeover flag 23 and the extension permitted time 24. The same is true of the communication means 22.

A priority order is set for each application in this manner, thereby reducing the labor hour of an input operation necessary for creating an information table, and simplifying the complexity of the operability of such an input operation. This results in an improvement of the convenience of the communication terminal 1.

On the other hand, in a case where the priority order 25 for setting a priority order is not provided for the user but the user inputs two information of the changeover flag 23 and the extension permitted time 24, a setting in accordance with the user's preference in detail becomes possible, thereby improving the usability of the communication terminal 1.

Note that in the information tables 200, 201 shown in FIGS. 3A and 3B, the communication means 22, the changeover flag 23, the extension permitted time 24, and the priority order 25 are set in association with each application, but those may be set in association with each of various communication conditions, such as each communication partner, each group of a communication partner, and each connection device of a communication destination. Regarding an application in which the transmission/reception of a content is carried out, the changeover flag 23, the extension permitted time 24, and the priority order 25 may be set in association with the kind of the content, the file size thereof, and the like.

Further, any communication conditions, such as an application, a communication partner, a group of the communication partner, a connection device of a communication destination, and a content may be combined together and the changeover flag, the extension permitted time, and the priority order may be set in association with the foregoing combination.

The foregoing communication conditions can be set in the information tables through an input operation using the operation unit 16.

This enables a detailed setting in accordance with the user's preference, thereby improving the usability of the communication terminal 1.

The power unit 15 has a power controller 151 and a battery 152.

The power controller 151 controls power supplied to the first wireless communication unit 131 and the second wireless communication unit 132. The battery 152 supplies power to the communication terminal 1 entirely.

The operation unit 16 has various keys and buttons for inputting an instruction of a user, and data. As such keys and buttons are operated by the user, the operation unit 16 inputs an operation signal in accordance with the content of the operation to the controller 11. Such buttons include a power button to turn ON or OFF the power of the communication terminal 1.

The user can set various information in the information tables 200, 201 shown in FIGS. 3A and 3B, and input an instruction, such as turning ON or OFF the power of the communication terminal 1 by operating the operation unit 16.

The display unit 17 comprises a dot matrix type LCD (Liquid Crystal Display) panel, a driver circuit, and the like, and displays an arbitrary image.

The voice microphone 13a collects voices and converts the voices into electrical signals, and outputs the electrical signals to the communication unit 13.

The voice speaker 13b outputs a voice corresponding to a demodulated voice signal in a telephone call.

The output unit 18 comprises a speaker 181 and a vibrator 182. The speaker 181 outputs a music, and the vibrator 182 vibrates. The output unit 18 is mainly used as an incoming alert for the user.

The bus 10 mutually transmits data among the controller 11, the memory unit 12, the display unit 17, and the output unit 18.

Next, an explanation will be given of the operation of the communication control unit 111 when controlling the communication unit 13, i.e., a communication control process with reference to the flowchart of FIG. 4. In the communication control process, the communication control unit 111 controls the communication unit 13 in such a way that a wireless interface desired by the user is used as much as possible.

The communication control process is started as the user presses a transmission button in the operation unit 16 of the communication terminal 1.

Before the communication control process is started, the management unit 111d saves the communication states of the wireless interfaces embedded in the communication unit 13, such as "idle", "out of range", or "connect", as the communication state information 124 in the memory unit 12. The management unit 111d detects acquisition conditions of radio waves through the first wireless communication unit 131 and the second wireless communication unit 132 of the communication unit 13 in accordance with the necessity, and updates the communication state information 124 while the communication control process is being executed.

The information table 200 or 201 shown in FIG. 3A or FIG. 3B, respectively, is set for the changeover availability information table 126, the communication-means information table 127, and the extension-permitted-time information table 128 through an input operation using the operation unit 16.

As the transmission button in the operation unit 16 is pressed, the communication control unit 111 receives a request of starting a communication from the operation unit 16 (step S300).

As receiving the request of starting a communication, the access control unit 111a refers to the communication-means information table 127 and the communication state information 124, and determines whether or not the communication state of a wireless interface (e.g., a wireless interface set in the communication means 22 corresponding to an application set in the application 21 in the information table 200 shown in FIG. 3A) corresponding to an application subjected to a request of starting a communication is a state which can request for a connection (step S301). Hereinafter, an application set in the application 21 is simply called "application 21", and a wireless interface set in the communication means 22 corresponding to that application 21 is simply called "communication means 22". Furthermore, a flag set in the changeover flag 23 corresponding to that application 21 is simply called "changeover flag 23", and a time set in the extension permitted time 24 corresponding to that application 21 is simply called "extension permitted time 24".

(When A Connection Request Is Not Possible)

First, an explanation will be given of a case where it is determined in the step S301 that a communication through the communication means 22 is not possible. In this case (step S301: NO), the access control unit 111a notifies the save process unit 111e of information to the effect that a communication through the communication means 22 is not possible, and the save process unit 111e stores information on a connection request using the communication means 22 as the connection request information 125 in the memory unit 12 (step S304).

In the step S304, after the connection request information 125 is saved, the access control unit 111a refers to the changeover availability information table 126, and determines whether the changeover flag 23 is set ON or OFF, i.e., whether or not to change over the wireless interface to another wireless interface (step S305).

(When The Changeover Flag Is Set OFF)

First, an explanation will be given of a case where the changeover flag 23 is set OFF in the step S305. In this case (step S305: NO), the access control unit 111a requests the timer control unit 111c to set up the timer for deciding a timing of changing over the wireless interface, and the timer control unit 111c refers to the extension-permitted-time information table 128, and sets the extension permitted time 24 to the timer 19 (step S306).

In the step S306, after the timer control unit 111c sets the the extension permitted time 24 to the timer 19, the access control unit 111a refers to the changeover timer information 123, and determines whether or not the timer 19 (hereinafter called "changeover timer") expires, i.e., whether or not the extension permitted time elapses (step S308).

When it is determined in the step S308 that the changeover timer has not expired (step S308: NO), the access control unit 111a refers to the first retry-connection request operation information 121, or the second retry-connection request operation information 122, and determines whether or not it is a timing at which the communication means 22 performs an retry-connection request operation (step S309).

When the access control unit 111a determines in the step S309 that it is not a timing of performing a retry-connection request operation (step S309: NO), the process returns to the step S308 and the access control unit 111a determines whether or not the changeover timer expires.

In this manner, a timer determination in the step S308 and a determination of the connection request timing in the step S309 are repeated until the determination result in the step S308 becomes positive or the determination result in the step S309 becomes positive.

While repeating the process, when the access control unit 111a determines in the step S309 that it is a connection request timing (step S309: YES) before the changeover timer expires, the access control unit 111a refers to the communication-means information table 127 and the communication state information 124, and determines whether or not the communication means 22 corresponding to the application is in a state where a communication is possible (step S310).

When the determination result is negative, the communication control unit 111 returns the process to the step S308. Thereafter, the timer determination in the step S308 and the determination of the connection request timing in the step S309 are repeated until the determination result in the step S308 becomes positive or the determination result in the step S309 becomes positive.

While repeating the process, when the determination result in the step S309 becomes positive before the changeover time expires, the determination in the step S310 is repeated again. When the determination result in the step S310 becomes negative, the communication control unit 111 returns the process to the step S308 again.

In this manner, in a case where the changeover flag is set OFF, the timer 19 counts the extension permitted time 24, and when it becomes a connection request timing (step S309: YES) while the timer 19 is counting the time (step S308: NO), it is determined whether or not a connection request is possible.

When it is determined in the step S310 that a connection request through the communication means 22 is possible(step S310: YES), the access control unit 111a reconfigures the connection request information saved in the connection request information 125 (step S311).

Further, the access control unit 111a executes a connection request process using a wireless interface corresponding to the communication means 22 of the communication unit 13 (step S312).

The connection request process (i.e., connection request retry) in the step S312 is automatically executed in the background in a case where a desired wireless interface is in a usable state at a retry connection request timing. Execution of the connection request process is not notified to the user.

In the step S312, prior to the connection request process, the access control unit 111a may refer to presence information of a communication partner, and determine whether or not to execute the process based on the presence information. The presence information is acquired by a non-illustrated presence information acquisition unit, constituting the controller 11, from a wireless base station. Referring the presence information enables the access control unit 111a to figure out the communication state of the communication partner, so that it is possible to eliminate an unnecessary execution of the connection request process when the communication partner is in a state where a communication is not possible. Accordingly, the communication terminal 1 does not execute an unnecessary connection request process and retry process, thereby reducing the power consumption.

After the connection request process is executed, the access control unit 111a determines whether or not the connection request process successes (step S313).

When it is determined in the step S313 that the connection request process successes (step S313: YES), the communication control unit 111 ends the process (END).

On the other hand, when it is determined in the step S313 that the connection request process is failed (step S313: NO), the communication control unit 111 waits a timing of a communication retry, and returns the process to the process of determining whether or not the changeover timer expires (step S308), and the foregoing process is repeated.

(When The Changeover Timer Expires)

On the other hand, when it is determined in the step S308 that the changeover timer expires (step S308: YES), the access control unit 111a instructs the selection unit 111b to select a wireless interface to be used. As receiving the instruction, the selection unit 111b selects the wireless interface, and saves information on such a selection in the selection information 129 (step S307).

Selection by the selection unit 111b enables a changeover of the wireless interface from the first wireless communication unit 131 to the second wireless communication unit 132, or from the second wireless communication unit 132 to the first wireless communication unit 131.

In the step S307, after the wireless interface is changed over, the access control unit 111a refers to the selection information 129, and determines whether or not the communication state of the wireless interface set in the selection information 129 is a state where a communication is possible (step S314).

When it is determined in the step S314 that the wireless interface in use is not in a state where a communication is possible (step S314: NO), the access control unit 111a refers to the first retry-connection request operation information 121 or the second retry-connection request operation information 122, and determines whether or not it is a timing at which the wireless interface performs a retry-connection request operation (step S315).

When the access control unit 111a determines in the step S315 that it is not a timing of performing the retry-connection request operation (step S315: NO), the communication control unit 111 returns the process to the step S315. The determination operation is repeated until the determination result in the step S315 becomes YES, and the communication control unit 111 becomes a state of idling a retry connection request. When the access control unit 111a determines in the step S315 that it becomes a connection request timing (step S315: YES), the communication control unit 111 returns the process to the step S314.

In this manner, the process from the step S314 to the step S315 is repeated until the wireless interface can request for a connection in the step S314.

When it is determined in the step S314 that the communication state of the changed wireless interface is a state where a communication is possible (step S314: YES), the access control unit 111a refers to the connection request information 125, and reconfigures the connection request information 125 saved in the memory unit 12 (step S316). However, unlike the step S311, the wireless interface used in this step differs from one requested in the step S300.

The access control unit 111a executes a connection request process (connection request retry) using the wireless interface after the changeover (step S317).

Because of a reason which is same as that of the step S312 explained above, the access control unit 111a may refer presence information on a communication partner prior to the connection request process, and may determine whether or not to execute the connection request process based on the presence information. Accordingly, the communication terminal 1 does not execute an unnecessary connection request process, thereby reducing power consumption.

In the step S317, after the connection request process is executed, the access control unit 111a determines whether or not the connection request process successes (step S318).

When it is determined in the step S318 that the connection request process is failed (step S318: NO), the process returns to the step S315, and the determination operation is repeated and the communication control unit 111 becomes a state of idling a retry of connection request until the determination result in the step S315 becomes YES. When the access control unit 111a determines in the step S315 that it becomes the connection request timing, the process returns to the step S314 as explained before, and the connection request process is executed in the step S317 at last.

When it is determined in the step S318 that the connection request process successes (step S318: YES), the communication control unit 111 ends the process (END).

(When The Changeover Flag Is Set ON).

On the other hand, when the changeover flag 23 is set ON in the step S305 (step S305: YES), the access control unit 111a forwards the process to the step S307, and then the foregoing process is executed.

Namely, the process progresses to the step S307 when the determination result in the step S305 becomes positive or when the determination result in the step S308 becomes positive, and the access control unit 111a changes over a wireless interface to another wireless interface, and performs connection request using the wireless interface after the changeover.

(When It Is Determined As A Connection Request Is Possible)

Next, an explanation will be given of a case where it is determined in the step S301 that a connection request through a wireless interface is possible(step S301: YES). In this case, the access control unit 111a executes a connection request process using the communication means 22 corresponding to the application 21 (step S302).

Because of the same reason explained above, presence information indicating the communication state of a communication partner may be acquired prior to the connection request process, and it may be determined whether or not to execute the connection request process in the step S302. Referring to the presence information makes it possible for the communication terminal 1 to figure out the communication state of the communication partner, so that the communication terminal 1 progresses the process to the step S304 without executing the connection request process when the communication partner is in a state where a communication is not possible. Accordingly, the communication terminal 1 does not execute an unnecessary connection request process, thereby reducing power consumption.

In the step S302, after the connection request process is executed, the access control unit 111a determines whether or not the connection request process successes (step S303).

When it is determined in the step S303 that the connection request process successes (step S303: YES), the communication control unit 111 ends the process (END).

On the other hand, when it is determined in the step S303 that the connection request process is failed (step S303: NO), the communication control unit 111 progresses the process to the step S304.

Before the process progresses to the step S304, the process may return to the step S302, and the access control unit 111a may retry the connection request process plural times. Even if a connection request process is once failed due to an unexpected reason, a connection request often successes by repeating the connection request process, and thus improving a connection request success rate.

Figure 5:
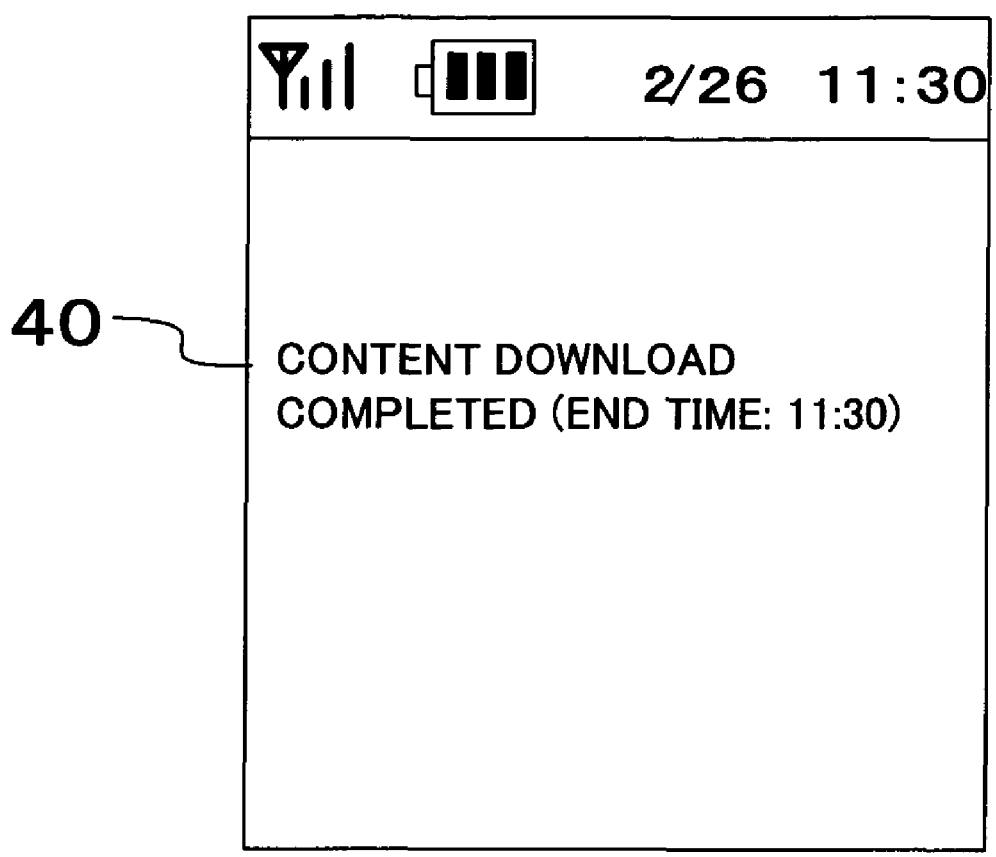
FIG. 5 is a diagram showing a display screen of a display unit when a communication is completed.

In a case where it is determined in the step S313 that the connection request successes (step S313: YES) and in a case where it is determined in the step S318 that the connection request successes (step S305: NO and step S318: YES), for example, a display screen 40 of notifying the user of a completion of a content download shown in FIG. 5 may be displayed on the display unit 17 under the control of the controller 11. While at the same time, a sound or a vibration may be output through the speaker 181 or the vibrator 182.

This allows the user to eliminate an effort of checking whether or not a communication has completed. This results in a further improvement of the convenience of the communication terminal 1.

According to the embodiment, in a case where the changeover flag 23 is set ON in the step S305, the extension permitted time 24 is counted, and when the changeover timer expires, the process returns to the step S307, and a wireless interface used for a communication is changed over to another wireless interface, as an action of avoiding a case where the communication means 22 selected by the user beforehand does not become a state where a communication is possible, and a communication is not carried out for a long time.

However, in addition to such an action, for example, the process may progress to the step S307 when it is determined that the position of the communication terminal 1 does not change for a certain time Tg based on GPS (Global Positioning System) information acquired by the communication terminal 1, and the wireless interface may be changed over to another wireless interface. The certain time Tg may be set by the user through the operation unit 16, or may be a time set beforehand.

This makes it possible for the communication terminal 1 to promptly determine that there is little possibility that the communication state of that wireless interface becomes a state where a communication is possible, thereby reducing an unnecessary acquisition process of a radio wave. As a result, the communication terminal 1 can reduce the power consumption thereof.

Further, according to the embodiment, the wireless interface is changed over using the changeover flag 23 and the extension permitted time 24 set beforehand through input operations using the operation unit 16, but the communication terminal 1 may employ a structure such that the user can set the changeover flag 23 and the extension permitted time 24 through input operations using the operation unit 16 when the user presses the transmission button to request the communication terminal 1 to start a communication.

Figure 6:
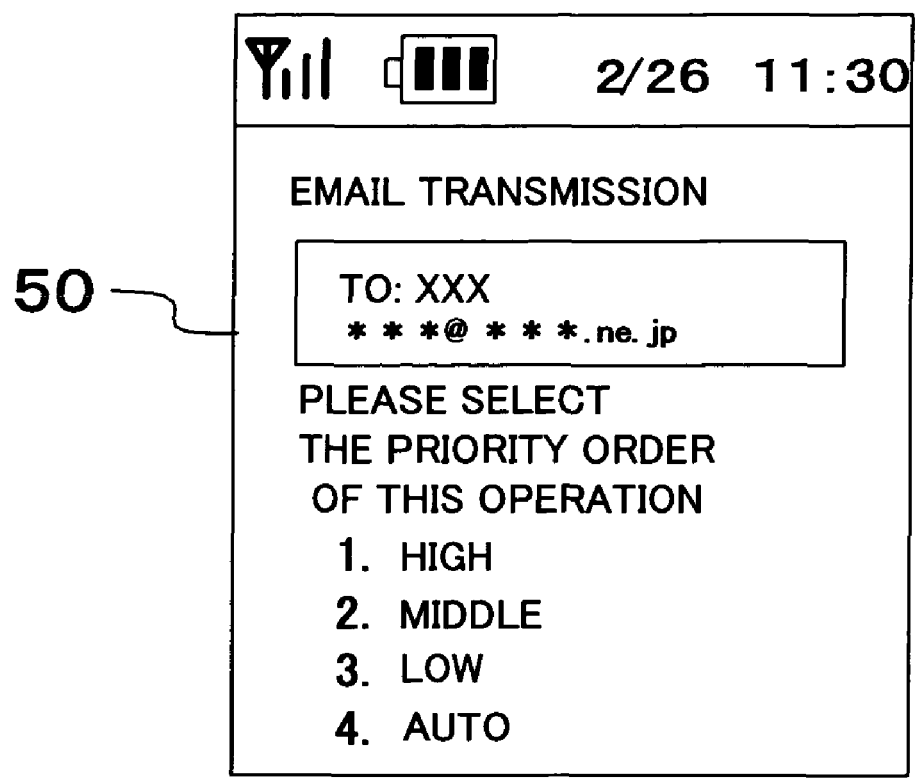
FIG. 6 is a diagram showing a display screen of the display unit when a communication is started.

For example, after the user presses the transmission button, a user-priority-order selection display screen 50 exemplified in FIG. 6 may be displayed on the display unit 17. The user can set a priority order while viewing the user-priority-order selection display screen 50. As the user selects a priority order, like the same setting scheme of the information table 201 shown in FIG. 3B, the changeover flag 23 and the extension permitted time 24 in accordance with the priority order can be set.

A screen which allows the user to directly select and set the changeover flag 23 and the extension permitted time 24 may be displayed, and the changeover flag 23 and the extension permitted time 24 may be directly set through input operations using the operation unit 16.

Accordingly, the user does not need to set the changeover flag 23 and the extension permitted time 24 beforehand, thereby eliminating the need of such an input operation. This results in an improvement of the convenience of the communication terminal 1.

Moreover, when the user sends an E-mail through an application for transmitting/receiving an E-mail, the user can individually set a priority order in accordance with an availability of an occasion, such as a communication partner, and the importance of a content of the E-mail. Accordingly, for example, it becomes possible to send an important E-mail right away, and to send an E-mail not so important later. This makes it possible for the user to change the communication state in accordance with individual E-mails, thereby improving the usability of the communication terminal 1.

When it is determined in the step S301 that a connection request using a wireless interface desired by the user is not possible (step S301: NO), a power supply process of supplying power from the power controller 151 to the communication unit 13 may be terminated until the access control unit 111a determines in the step S309 that it becomes a connection request timing (step S309: YES).

Figure 7:
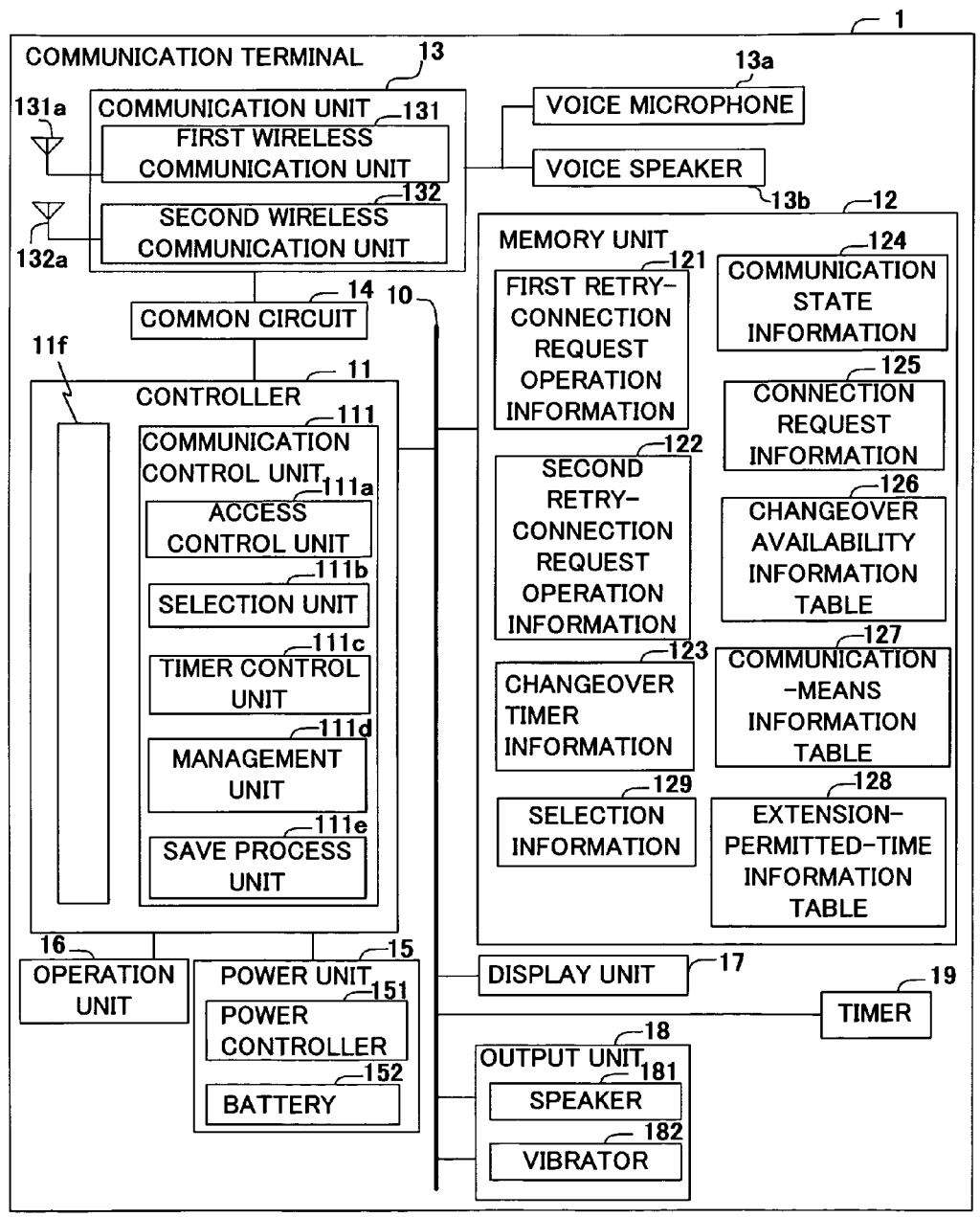
FIG. 7 is a diagram showing a modified example of the structure of the communication terminal shown in FIG. 1.

Such a power supply control can be realized by adding a power controller control unit 1 if in the controller 11 of the communication terminal 1 as shown in FIG. 7. The power controller control unit 1 if receives a notification from the access control unit 111a, and controls the power controller 151.

Carrying out such a power supply control enables the communication terminal 1 to reduce power consumption by the wireless communication units, and the life duration of the battery can be extended by what corresponds to the reduction of the power consumption. This results in a further improvement of the convenience of the communication terminal 1.

(Second Embodiment)

Next, an explanation will be given of the second embodiment of the invention with reference to FIGS. 8 to 10.

In the first embodiment, in a case where a connection request process using a wireless interface selected beforehand by the user is failed, but then the connection request process using that wireless interface becomes possible, the communication control unit 111 automatically execute the connection request process in the background (step S312 in FIG, 4). In the embodiment, however, the communication control unit 111 does not automatically execute the connection request process, but notifies the user of the communication state of the wireless interface.

Figure 8:
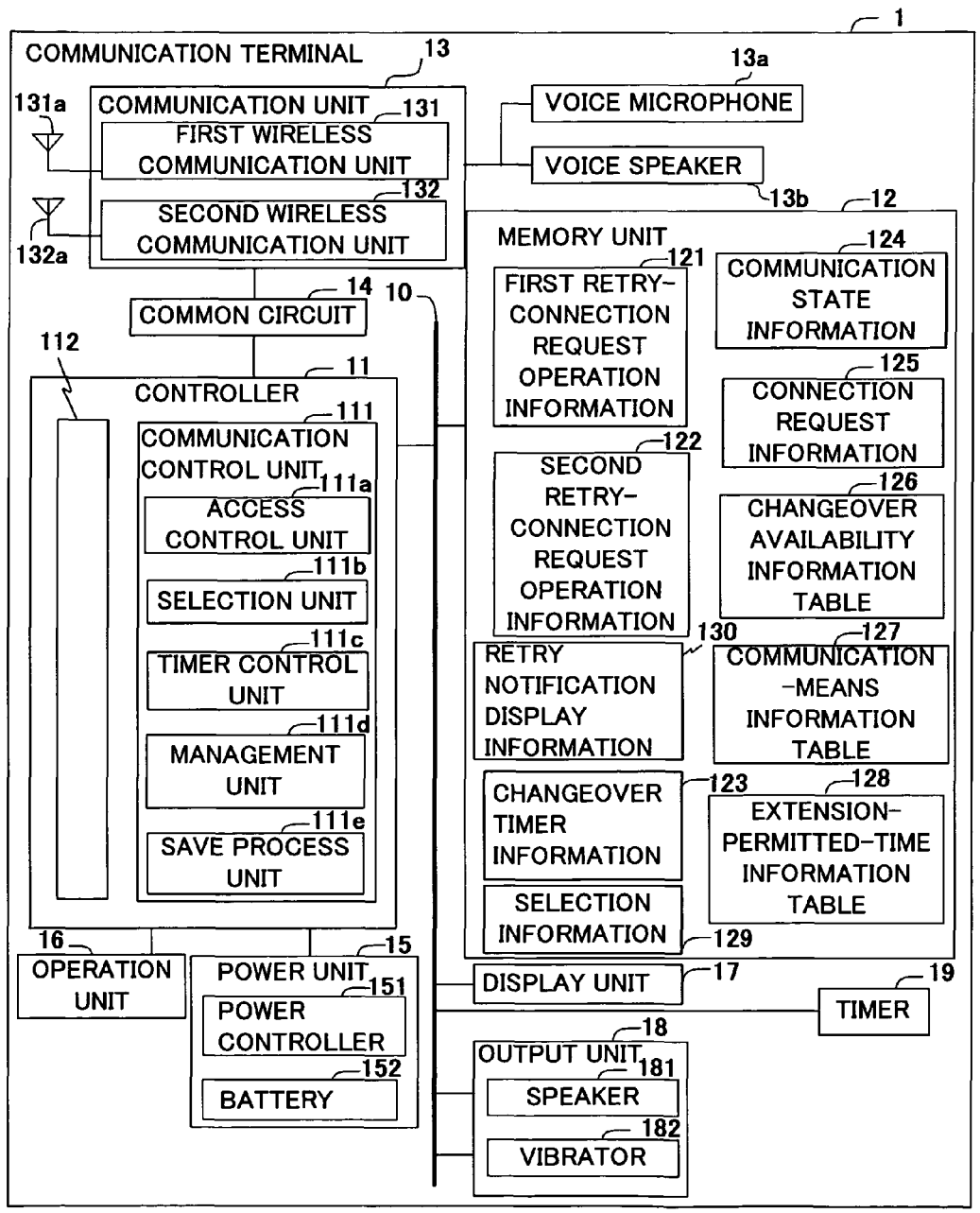
FIG. 8 is a diagram showing the structure of a communication terminal according to the second embodiment of the invention.

As shown in FIG. 8, the communication terminal 1 further has a notification process unit 112 embedded in the controller 11 in the embodiment.

The notification process unit 112 activates the speaker 181 or the vibrator 182 in response to an instruction from the access control unit 111a, and sends the display unit 17 display information in a predetermined format indicating that a connection request process is possible. The display information in the predetermined format indicating that a retry-connection request process is possible is stored as retry-notification display information 130 in the memory unit 12 beforehand.

Next, an explanation will be given of the operation of the communication terminal 1 of the embodiment with reference to the flowchart of FIG. 9 in comparison with the flowchart of FIG. 4.

Figure 4:
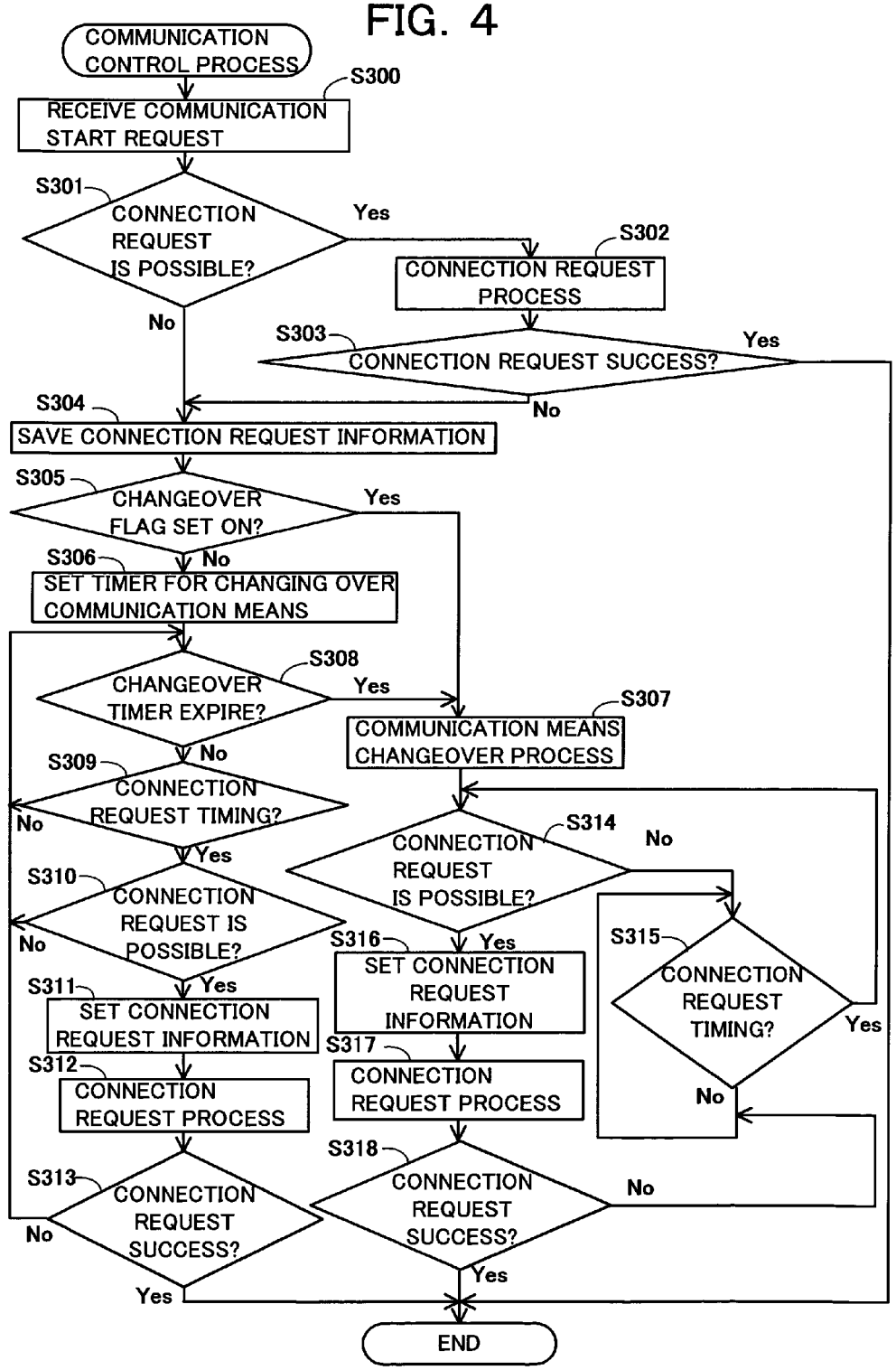
FIG. 4 is a flowchart showing a communication control process of the communication terminal shown in FIG. 2.
Figure 9:
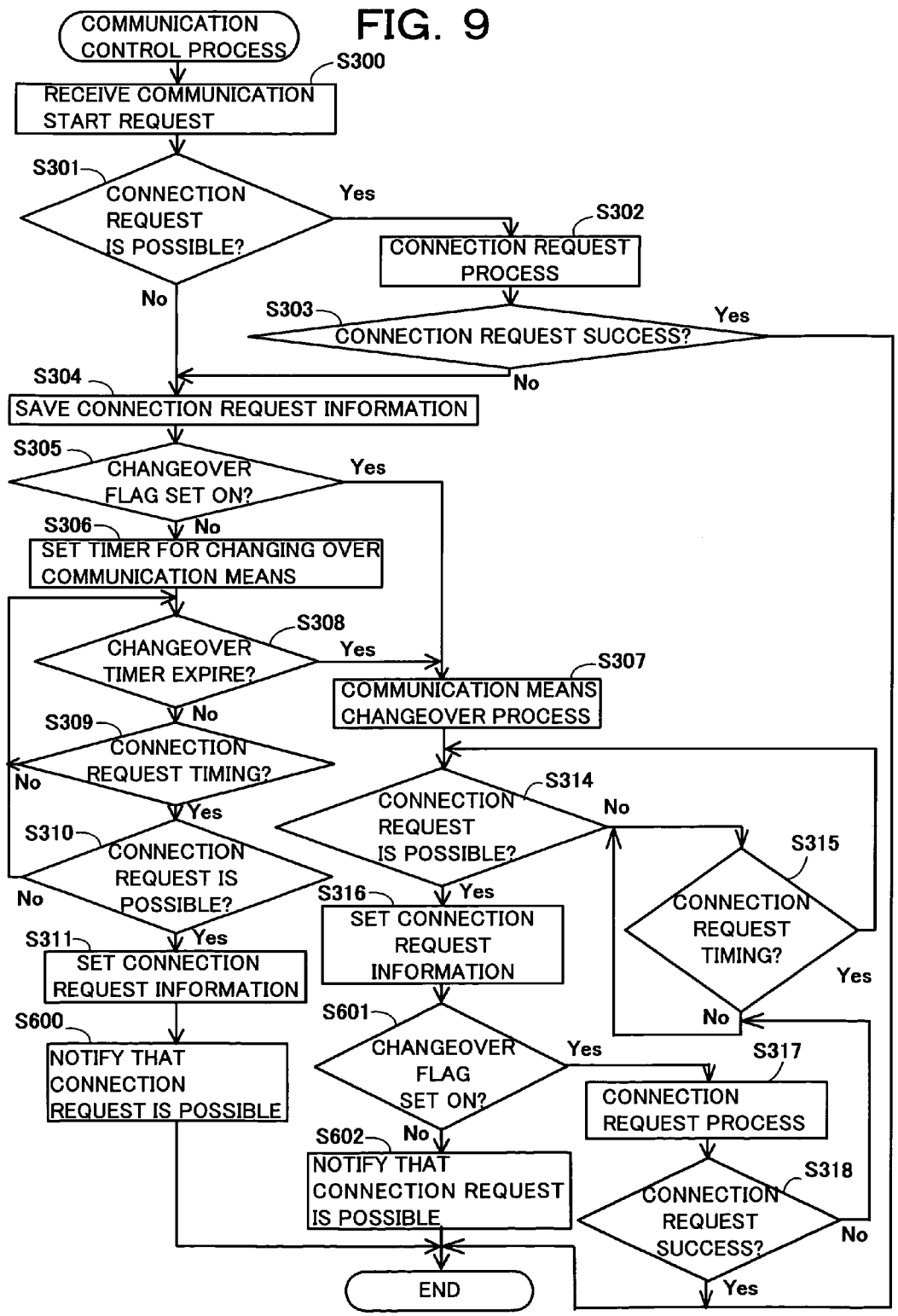
FIG. 9 is a flowchart showing a communication control process of the communication terminal shown in FIG. 8.

Note that steps of executing similar processes to those in FIG. 4 will be denoted by the same reference numerals in FIG. 9. That is, the different points of the embodiment from the first embodiment are that a step S600 is executed instead of the steps S312 and S313, and steps S601 and S602 are executed.

When it is determined in the step S310 that the communication state of the wireless interface in use is a state where a communication is possible (step S310: YES), the access control unit 111a sets the connection request information 125 stored the memory unit 12, and instructs the notification process unit 112 to notify the user of the communication state(step S311). As receiving the instruction, the notification process unit 112 performs a notification to the effect that a connection request process using the selected wireless interface becomes possible by activating the speaker 181 or the vibrator 182, while at the same time, refers to the retry notification display information 130, and sends the display unit 17 display information in a predetermined format indicating that the connection request process becomes possible (step S600).

When it is determined in the step S314 that the communication state of a wireless interface after the changeover is a state where a communication is possible (step S314: YES), the access control unit 111a sets the connection request information stored in the memory unit 12 (step S316), and determines whether or not the changeover flag 23 is set ON (step S601).

When it is determined in the step S601 that the changeover flag 23 is set ON (step S601: YES), the process progresses to the step S317, and the access control unit 111a executes the same connection request process as that of the step S317 in FIG. 4.

On the other hand, when it is determined in the step S601 that the changeover flag 23 is not set ON (step S601: NO), the access control unit 111a instructs the notification process unit 112 to notify the user of the communication state of the wireless interface. As receiving the instruction, the notification process unit 112 performs a notification to the effect that the connection request process becomes possible by activating the speaker 181 or the vibrator 182, while at the same time, refers to the retry notification display information 130, and sends the display unit 17 display information in the predetermined format indicating that the retry connection request process becomes possible (step S602).

Figure 10:
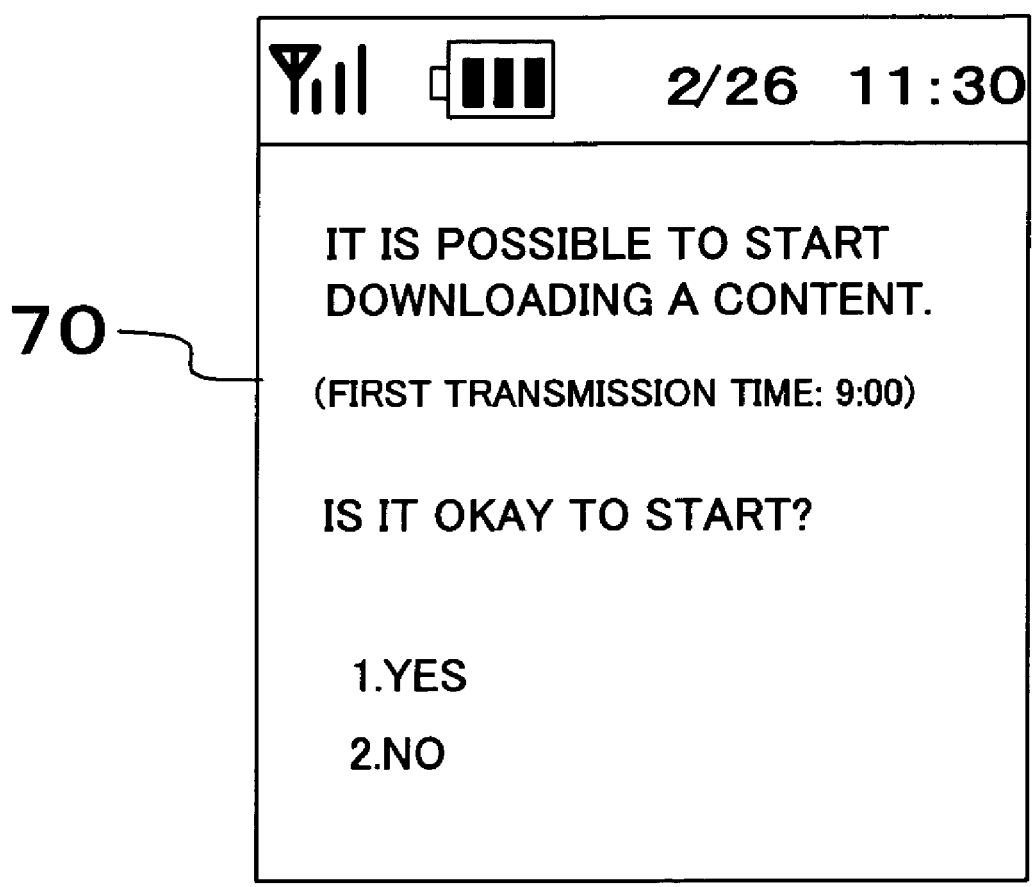
FIG. 10 is a diagram showing a display screen of a display unit in starting a communication retry.

In the step S600 and the step S602, the notification process unit 112 may send a display screen 70 of notifying a start of a content download exemplified in FIG. 10 to the display unit 17. Displaying such a screen makes it possible for the user to arbitrary select whether or not to request for a connection in accordance with the state of an occasion, thereby further improving the usability of the communication terminal 1.

As explained above, according to the foregoing individual embodiments, regarding an application which does not need to complete a communication quickly, i.e., an application which does not need to perform a communication at a real time like a downloading of a content, the communication terminal 1 idles until the wireless interface desired by the user becomes available, and starts a communication when the wireless interface becomes available.

The present invention is not limited to the foregoing embodiments, and can be changed and modified in various forms.

For example, the process of the first embodiment shown in FIG. 4 and the process of the second embodiment shown in FIG. 9 may be combined and executed together.

When it is determined in the step S310 that the communication state of the wireless interface in use is a state where a communication is possible (step S310: YES), the access control unit 111*a* may detect the remaining level of the battery 152, and may determine whether or not the remaining level of the battery 152 is higher than or equal to an arbitrary threshold (Th).

In this case, when it is determined that the remaining level of the battery 152 is higher than or equal to the threshold Th, the process progresses to the step S312 through the step S311, and the access control unit 111*a* automatically executes a connection request process in the background.

On the other hand, when it is determined that the remaining battery level is lower than the threshold Th, the process progresses to the step S600 through the step S311, and the notification process unit 112 asks the user whether or not to execute a connection request process.

This prevents an adverse effect originating from an automatic start of a communication when the remaining level of the battery 152 is low, while at the same time, when the remaining level of the battery 152 is sufficient, a communication is automatically executed, thereby reducing an operation of the user. This results in a further improvement of the convenience of the communication terminal 1.

The successive operations of the first and second embodiments are started as the user requests the communication terminal 1 to start a communication, but may be started when the communication terminal 1 is in communication.

For example, when an error occurs in a communication on a connection source side or a connection destination side while a communication through either the first wireless communication unit 131 or the second wireless communication unit 132 is being carried out, and a continuation of the communication becomes impossible, the process may be started from the step S304 shown in FIG. 4. In the step S304, necessary information for restarting a communication is stored as the connection request information 125 in the memory unit 12. As explained above, the connection request information 125 includes information on an application 21 and address information of a connection destination. The process is forwarded as shown in FIG. 4 after the step S304.

The number of wireless communication units that the communication unit 13 has may be expanded to n (n is an integer greater than or equal to three), from the first wireless communication unit to nth wireless communication unit.

In this case, as shown in FIG. 11, any one of wireless communication units from the first wireless communication unit to the nth wireless communication unit is set in each communication means 22 in an information table 202, and n number of flags from the first changeover flag 23*a* to nth changeover flag 23*c* are set as changeover flags, and n number of extension permitted times from the first extension permitted time 24*a* to nth extension permitted time 24*c* are set as extension permitted times.

A changeover flag, when the first wireless communication unit is set as the communication means 22, is set in a first changeover flag 23*a*, and changeover flags, when a second wireless communication unit to n-1th wireless communication unit are set as respective communication means 22, are set in a second changeover flag to n-1th changeover flag 23*b*, respectively. Moreover, a changeover flag, when nth wireless communication unit is set as the communication means 22, is set in nth changeover flag 23*c*.

An extension permitted time, when the first wireless communication unit is set as the communication means 22, is set in a first extension permitted time 24*a*, and extension permitted times, when a second wireless communication unit to n-1th wireless communication unit are set as respective communication means 22, are set in a second extension permitted time to n-1th extension permitted time 24*b*. An extension permitted time, when nth wireless communication unit is set as the communication means 22, is set in nth extension permitted time 24*c*.

Therefore, when a wireless interface set as the communication means 22 is kth (k=1 to n) wireless communication unit, kth changeover flag is used in the step S305 (see, FIG. 9), and kth extension permitted time is used in the step S308.

Figure 12:
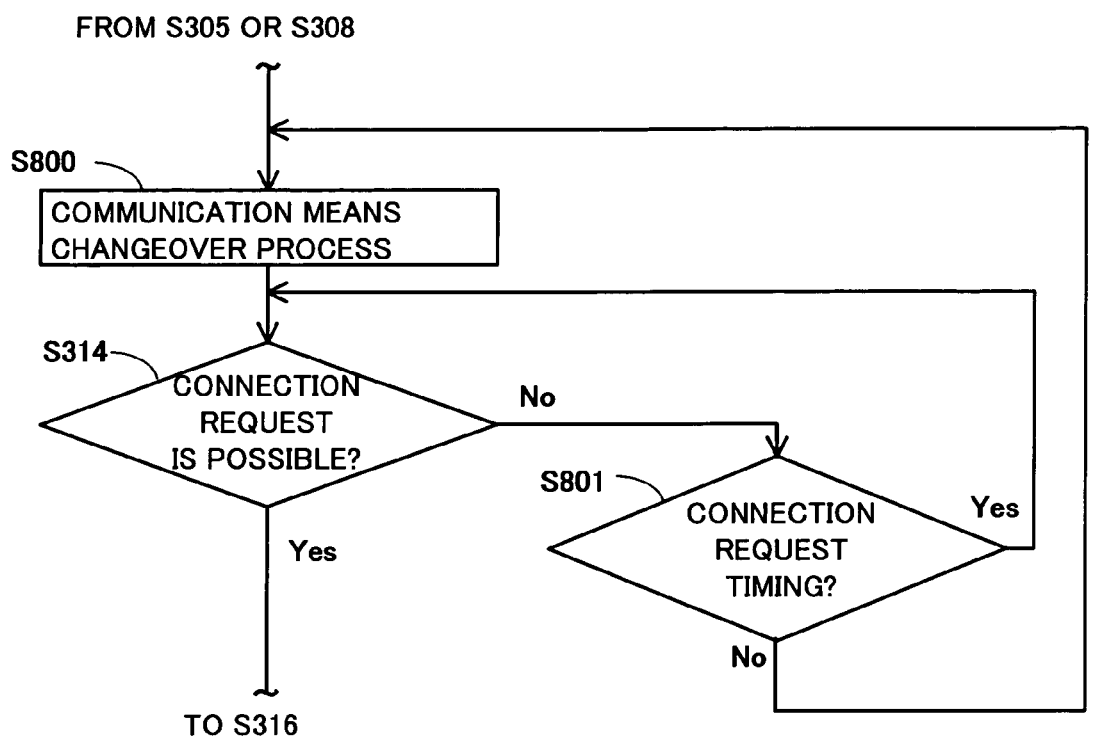
FIG. 12 is a part of a flowchart showing a communication control process when the first to nth wireless communication units are present.

In a case where the communication unit 13 has first to nth wireless interfaces, as shown in FIG. 12, when an access control unit 111*a* determines in a step S801 that it is a timing of executing a retry-connection request operation (step S801: YES), the access control unit la progresses the process to the step S314, and determines whether or not a wireless interface after a changeover is in a state where a communication is possible (step S314).

On the other hand, when the access control unit 111*a* determines in the step S801 that it is not a timing of executing a retry-connection request operation (step S801: NO), the access control unit 111*a* returns the process to a step S800 to select a wireless interface not selected so far.

Here is a description "select a wireless interface not selected so far", and when the communication unit 13 has n number of wireless interfaces, as shown in FIG. 13, it is necessary to provide a table where proficiency of a wireless communication unit is selectable to designate the selection order of the wireless interfaces. The selection order (priority order) of the wireless interfaces can be set for each application. In the step S800, the access control unit 111*a* refers to this table, and changes over a wireless interface in accordance with a priority order.

As explained above, if the communication unit 13 has at least both of a wireless communication unit in a wide cellular communication scheme and a wireless communication unit in a local wireless communication scheme, the communication unit 13 may further have larger number of wireless interfaces. By employing such a structure, the range of selections of a wireless interface corresponding to an application to be executed becomes wider for a user, thereby enabling a communication corresponding to the need of the user in detail.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-159535 filed on Jun. 15, 2007 and including specification, claims, drawings and summary. The disclosure of the above Japanese Patent Application is incorporated herein by reference in its entirety.

What is claimed is:

1. A communication terminal comprising:
   a plurality of wireless interfaces;
   a communication availability determination unit which determines whether a connection request through a first wireless interface determined prior to the connection request of the plurality of wireless interfaces is possible based on a state of the first wireless interface determined prior to the connection request;

a connection request controller which idles without performing a connection request for a permitted time which varies according to a size of a content transmitted or received, a kind of the content, or a combination of the size of the content and the kind of the content, when the communication ability determination unit determines that a connection request through the first wireless interface determined prior to the connection request is not possible; and a selection unit which selects a second wireless interface of the plurality of wireless interfaces to use for the communication based on changeover destination information of the first wireless interface determined prior to the connection request after the permitted time has passed.

2. The communication terminal according to claim 1, further comprising a changeover determination unit which determines whether to change over a wireless interface used for a communication based on predetermined changeover availability information when the communication availability determination unit determines that a connection request through the first wireless interface determined prior to the connection request is not possible.

3. The communication terminal according to claim 2, further comprising a connection request information saving unit which saves connection request information necessary for performing a connection request retry through the first wireless interface determined prior to the connection request when the changeover determination unit determines that a changeover of the first wireless interface can not be carried out, and wherein the connection request controller performs a connection request retry through the first wireless interface determined prior to the connection request based on the connection request information saved in the connection request information saving unit when the communication availability determination unit determines that a connection request through the first wireless interface determined prior to the connection request is possible.

4. The communication terminal according to claim 3, further comprising a notification unit which notifies a user of a success of a connection request through the first wireless interface determined prior to the connection request.

5. The communication terminal according to claim 2, further comprising a notification unit which notifies a user that a connection request through the first wireless interface determined prior to the connection request becomes possible when the communication availability determination unit determines that a connection request through the first wireless interface determined prior to the connection request is possible.

6. The communication terminal according to claim 2, further comprising:

a connection request information saving unit which saves connection request information necessary for performing a connection request retry through the first wireless interface determined prior to the connection request when the changeover determination unit determines that a changeover of the first wireless interface can not be carried out; and a notification unit which notifies a user when a connection request through the first wireless interface determined prior to the connection request becomes possible, and wherein when the communication availability determination unit determines that a connection request through the first wireless interface determined prior to the connection request is possible, if a remaining level of a battery is greater than or equal to a predetermined threshold, the connection request controller performs a connection request retry through the first wireless interface determined prior to the connection request based on the connection request information saved in the connection request information saving unit, and if the remaining level of the battery is lower than the predetermined threshold, the notification unit notifies the user that a connection request through the first wireless interface determined prior to the connection request is possible.

7. The communication terminal according to claim 2, wherein:

one wireless interface of the plurality of wireless interfaces performs a communication through a first base station; and another wireless interface of the plurality of wireless interfaces different from the one wireless interface is configured to perform a communication through a second base station having a narrower communication area than a communication area of the first base station.

8. The communication terminal according to claim 2, further comprising a power controller which controls power supplied to the plurality of wireless interfaces, and wherein the power controller does not supply power to the first wireless interface determined prior to the connection request until the communication availability determination unit determines that a connection request through the first wireless interface determined prior to the connection request is possible.

9. The communication terminal according to claim 2, further comprising a communication-means information table where a wireless interface corresponding to each of plural different communication conditions is individually settable, and wherein the communication availability determination unit refers to the communication-means information table and determines whether a connection request through a wireless interface corresponding to a current communication condition is possible.

10. The communication terminal according to claim 9, further comprising a communication means setting unit which sets the wireless interface and/or the plural different communication conditions in the communication-means information table.

11. The communication terminal according to claim 2, further comprising a changeover availability information table where changeover availability information corresponding to each of plural different communication conditions is individually settable, and wherein the changeover determination unit refers to the changeover availability information table and determines whether to change over the first wireless interface determined prior to the connection request and used for the communication based on the changeover availability information corresponding to a current communication condition.

12. The communication terminal according to claim 11, further comprising a changeover availability information setting unit which sets the changeover availability information and/or the plural different communication conditions in the changeover availability information table.

13. The communication terminal according to claim 2, further comprising:

a timer for counting a time;

a timer controller which causes the timer to start counting a time when the changeover determination unit determines that a changeover of the first wireless interface can not be carried out, wherein the selection unit selects the second wireless interface to use for the communication from the plurality of wireless interfaces based on the changeover destination information, which is information on the first wireless interface determined prior to the connection request which is to be changed over, as the timer counts a permitted time in response to a present communication condition, before the communication availability determination unit determines that a connection request through the first wireless interface determined prior to the connection request is possible.

14. The communication terminal according to claim 13, further comprising a permitted time information table where the permitted time corresponding to each of plural different communication conditions is individually settable, and wherein the selection unit refers to the permitted time information table, and selects the second wireless interface to use for the communication as the timer counts up a permitted time corresponding to a current communication condition.

15. The communication terminal according to claim 14, further comprising a timer setting unit which sets the permitted time and/or the plural different communication conditions in the permitted time information table.

16. The communication terminal according to claim 13, further comprising:

a changeover availability information table where the changeover availability information corresponding to each of plural different communication conditions is individually settable;

a permitted time information table where the permitted time corresponding to each of plural different communication conditions is individually settable;

a priority order setting unit which sets a priority order for each of the plural different communication conditions; and an information setting unit which automatically sets the changeover availability information and the permitted time corresponding to each of the plural different communication conditions in the permitted time information table and the changeover availability information table based on the priority order corresponding to each communication condition.

17. The communication terminal according to claim 2, wherein the selection unit which selects the second wireless interface to be changed over to from among the plurality of wireless communications based on information, which is on the first wireless interface determined prior to the connection request and which is to be changed over, when the changeover determination unit determines that a changeover of the first wireless interface determined prior to the connection request can be carried out.

18. The communication terminal according to claim 17, further comprising a changeover-wireless-interface information table where information on a wireless interface which is to be changed over and which corresponds to each of plural different communication conditions is settable, and wherein the selection unit refers to the changeover-wireless-interface information table, and selects the second wireless interface to be changed over to that corresponds to a current communication condition.

19. The communication terminal according to claim 18, wherein the changeover-wireless-interface information table sets a plurality of wireless interfaces as wireless interfaces to be changed over to and which correspond to individual communication conditions in accordance with a priority order, and the selection unit refers to the changeover-wireless-interface information table and selects the second wireless interface to be changed over to and which corresponds to a current communication condition in accordance with the priority order.

20. The communication terminal according to claim 18, further comprising a changed-over-wireless-interface information setting unit which sets information on the second wireless interface to be changed over to and/or the plural different communication conditions in the changeover-wireless-interface information table.

21. A non-transitory recording medium storing a program that allows a computer to execute:

determining whether a connection request through a first wireless interface determined prior to the connection request of a plurality of wireless interfaces is possible based on a state of the first wireless interface determined prior to the connection request;

idling without performing a connection request for a permitted time which varies according to a size of a content transmitted or received, a kind of the content, or a combination of the size of the content and the kind of the content, when the communication ability determination unit determines that a connection request through the first wireless interface determined prior to the connection request is not possible; and selecting a second wireless interface of the plurality of wireless interfaces to use for the communication based on changeover destination information of the wireless interface determined prior to the connection request after the permitted time has passed.

* * * * *